US006322623B1

(12) United States Patent
Mifune et al.

(10) Patent No.: US 6,322,623 B1
(45) Date of Patent: Nov. 27, 2001

(54) LIGHT-SCREENING FILM PAINT FOR LAMPS, AND LIGHT-SCREENING FILM FOR LAMPS AND PRODUCING METHOD THEREOF

(75) Inventors: Tatsuo Mifune; Kazunori Sakamoto, both of Katano; Tsumoru Ohata, Kyoto; Masaru Watanabe, Nishinomiya, all of (JP)

(73) Assignee: Matsushita Electric Industrial Co., Ltd.

( * ) Notice: Subject to any disclaimer, the term of this patent is extended or adjusted under 35 U.S.C. 154(b) by 0 days.

(21) Appl. No.: 09/453,447

(22) Filed: Dec. 3, 1999

Related U.S. Application Data

(60) Division of application No. 09/150,340, filed on Sep. 10, 1998, now Pat. No. 6,015,592, which is a continuation-in-part of application No. 08/818,901, filed on Mar. 17, 1997, now abandoned.

(30) Foreign Application Priority Data

| | | |
|---|---|---|
| Mar. 19, 1996 | (JP) | 8-062366 |
| Nov. 18, 1996 | (JP) | 8-305405 |

(51) Int. Cl.[7] .......... C09D 5/32; C09D 101/28; C03C 14/00; H01J 9/00; C08K 3/40

(52) U.S. Cl. .......... 106/287.18; 106/197.01; 106/198.1; 106/286.2; 501/32; 445/58; 524/413

(58) Field of Search .......... 501/32; 106/197.01, 106/198.1, 286.2, 287.18; 445/58; 524/413

(56) References Cited

U.S. PATENT DOCUMENTS

| | | | |
|---|---|---|---|
| 3,023,338 | 2/1962 | Cerulli | 313/108 |
| 4,076,489 | 2/1978 | Schroeter et al. | 431/94 |
| 4,099,080 | 7/1978 | Dawson et al. | 313/116 |
| 4,391,847 | 7/1983 | Brown | 427/106 |
| 4,576,922 | 3/1986 | O'Brien et al. | 501/32 |
| 5,168,126 | 12/1992 | Matsumoto et al. | 174/52.4 |
| 5,326,728 * | 7/1994 | Boury et al. | 501/17 |
| 5,410,212 | 4/1995 | Reisman | 313/116 |
| 5,619,102 | 4/1997 | Scholler | 313/635 |
| 6,015,592 * | 1/2000 | Mifune et al. | 427/376.2 |

FOREIGN PATENT DOCUMENTS

| | | |
|---|---|---|
| 102 010 | 11/1973 | (DE) . |
| 2 073 857 | 9/1971 | (FR) . |
| 2 146 800 | 2/1973 | (FR) . |
| 1 422 491 | 1/1976 | (GB) . |
| 2 064 217 | 6/1981 | (GB) . |
| 2 268 622 | 1/1994 | (GB) . |
| WO 96/15548 | 5/1996 | (WO) . |

OTHER PUBLICATIONS

Imamura, Sealing Method by Glass Frit, JP359141141A, Aug. 13, 1984.*

* cited by examiner

*Primary Examiner*—David Brunsman
(74) *Attorney, Agent, or Firm*—Parkhurst & Wendel, L.L.P.

(57) ABSTRACT

There is disclosed a light-screening film paint for lamps containing (1) at least one compound of either manganese oxide or an iron oxide compound doped with a metallic manganese and having the formula $(Fe_xMn_{1-x})_2O_3$ where $0.95<x<0.70$; and (2) powder glass containing at least one of silica, zinc oxide, boron oxide and aluminum oxide. A light-screening film is produced by applying the paint to the surface of a lamp, followed by the firing at a temperature of not higher than 1,200° C.

11 Claims, 6 Drawing Sheets

FIG. 3

| | TEST 1 | TEST 2 | TEST 3 | TEST 4 | TEST 5 | TEST 6 | TEST 7 | TEST 8 | TEST 9 | TEST 10 |
|---|---|---|---|---|---|---|---|---|---|---|
| MIXTURE OF MANGANESE OXIDE POWDER AND MANGANESE-CONTAINED IRON OXIDE POWDER | 100 PARTS BY WEIGHT | 100 PARTS BY WEIGHT | 100 PARTS BY WEIGHT | 100 PARTS BY WEIGHT | 100 PARTS BY WEIGHT | 100 PARTS BY WEIGHT | 100 PARTS BY WEIGHT | 100 PARTS BY WEIGHT | 100 PARTS BY WEIGHT | 100 PARTS BY WEIGHT |
| POWDER GLASS MAINLY COMPRISING ZING OXIDE | 20 PARTS BY WEIGHT | 30 PARTS BY WEIGHT | 40 PARTS BY WEIGHT | 50 PARTS BY WEIGHT | 60 PARTS BY WEIGHT | 70 PARTS BY WEIGHT | 80 PARTS BY WEIGHT | 90 PARTS BY WEIGHT | 100 PARTS BY WEIGHT | 110 PARTS BY WEIGHT |
| FILM STRENGTH TEST RESULT (BEFORE LIGHTING) | × | ○ | ○ | ○ | ○ | ○ | ○ | ○ | ○ | ○ |
| FILM STRENGTH TEST RESULT(AFTER 1,500-HRS. DURATION OF LIGHTING) | × | ○ | ○ | ○ | ○ | ○ | ○ | ○ | ○ | ○ |
| DISCOLORATION RESULT (AFTER 1,500-HRS. DURATION OF LIGHTING) | ○ | ○ | ○ | ○ | ○ | ○ | ○ | ○ | ○ | × |
| TRANSMITTANCE RESULT | ○ | ○ | ○ | ○ | ○ | ○ | ○ | ○ | ○ | × |

FIG. 4

| MANGANESE CONTENT OF MANGANESE-CONTAINED IRON OXIDE | LIGHT-SCREENING FILM ESTIMATION RESULT |
|---|---|
| CONTENT : 0 | AFTER 1,500-HRS. DURATION OF LIGHTING, DEGREE OF DISCOLORATION INCREASED |
| 5 mol % | PASSED |
| 10 mol % | PASSED |
| 20 mol % | PASSED |
| 30 mol % | PASSED |
| 40 mol % | AFTER 1,500-HRS. DURATION OF LIGHTING, DEGREE OF DISCOLORATION INCREASED |

FIG. 5

| SOFTENING POINT OF POWDER GLASS | LIGHT-SCREENING FILM ESTIMATION RESULT |
|---|---|
| 500°C | AFTER 1,500-HRS. DURATION OF LIGHTING, LIGHT-SCREENING FILM PEELED |
| 600°C | PASSED |
| 700°C | PASSED |
| 800°C | PASSED |
| 900°C | PASSED |
| 1,000°C | PASSED |
| 1,100°C | PASSED |
| 1,200°C | OWING TO HIGH VISCOSITY, COATING IS DIFFICULT |

FIG. 6

| ADDED AMOUNT OF SILICA-CONTAINED CLAY MINERALS | ESTIMATION RESULT OF PAINT |
|---|---|
| 0. 1 PART | OWING TO LARGE LIQUID DRIPPING, COATING IS DIFFICULT |
| 0. 2 PART | PASSED |
| 1 PART | PASSED |
| 2 PARTS | PASSED |
| 3 PARTS | OWING TO HIGH VISCOSITY, COATING IS DIFFICULT |

FIG. 7

| ADDED AMOUNT OF METHYL CELLULOSE | ESTIMATION OF COATED FILM |
|---|---|
| 0. 1 PART | INSUFFICIENT ADHESION TO GLASS |
| 0. 2 PART | PASSED |
| 1 PART | PASSED |
| 2 PARTS | PASSED |
| 3 PARTS | OWING TO HIGH VISCOSITY, COATING IS DIFFICULT |

LIGHT-SCREENING FILM PAINT FOR LAMPS, AND LIGHT-SCREENING FILM FOR LAMPS AND PRODUCING METHOD THEREOF

REFERENCE TO RELATED APPLICATIONS

This is a Division of application Ser. No. 09/150,340 filed Sep. 10, 1998 now U.S. Pat. No. 6,015,592 which in turn is a Continuation-in-Part of application Ser. No. 08/818,901, filed Mar. 17, 1997 now abandoned.

FIELD OF THE INVENTION

The present invention relates to a light-screening film paint and film for a highly luminous automobile discharge lamp and a method of production thereof.

BACKGROUND OF THE INVENTION

FIG. 1 is a structural drawing of a highly luminous D2R-type discharge lamp for an automobile front lamp. This discharge lamp is constructed so that a metal iodide sealed in a quartz emissive section 5 emits light as a high tension is applied between the metal tungsten electrodes 1*a* and 1*b*. The emissive section 5 is covered with an external quartz tube 2. In comparison with a halogen lamp chiefly presently employed as the front lamp for automobiles, the halogen lamp of FIG. 1 advantageously provides a threefold luminosity at 70% consumed power. Besides, since unlike halogen lights, no filament is used in the lamp of FIG. 1, the service life is very long and not shorter than 1,500 hours.

In this discharge lamp, a light-screening film 4 is formed on the surface of an outer quartz tube 2 to control the projected light region. This light-screening film is about 20$\mu$m thick, and the shape and size thereof are such to be in compliance with the International Standard. The present invention relates also to a method for producing a light-screening film to be placed on the discharge lamp.

Using ferric oxide or cupric oxide as a pigment and sodium silicate or aluminum phosphate as a binder, a conventional light-screening film for lamps has been formed by mixing the pigment and the binder to form a paint; this paint is then applied to the glass surface of a lamp and the coat is fired at a temperature of from about 100° C. to about 250° C.

When such a lamp is lit, the temperature of the glass surface of the lamp rises; accordingly, the temperature of the light-screening film formed thereon rises also. Especially with a highly luminous automobile discharge lamp, the temperature of the lamp's glass surface rises to about 700° C. during the lighting and, accordingly, the light-screening film on the glass surface is exposed to a temperature of 700° C. also.

As mentioned above, a light-screening film made in accordance with prior art techniques uses ferric oxide or the like as pigment. Although cupric oxide is black at room temperature, this oxide is known to turn into red powder as oxidation progresses at about 350° C.

Thus, if a light-screening film is formed on a highly luminous discharge lamp for automobiles using prior art methods, the color of the light-screening film changes from black to red or white due as the temperature rises during lighting. When the color of the light-screening film turns from black to red or white, the absorbance of light changes, thereby leading to a decline in light-screening performance, which, of course, leads to various drawbacks. Discoloration of a light-screening film causes not only a decline in light-screening performance but the lamp also gives a bad appearance to the user; this, accordingly, has become a serious problem. Thus, there is a desire for a light-screening film material that undergoes no discoloration for a 1,500-hour lighting period.

Another problem results if a light-screening film is formed on a highly luminous automobile discharge lamp using prior art techniques. A heat cycle constituting ups and downs of temperature caused by the repetition of turning the lamp on and off causes cracking or peeling of the light-screening film, thereby resulting in loss of light-screening performance. To address this problem, a light-screening film material free of cracking or peeling due to lighting and extinction (turning the lamp on and off) over 1,500 hours is desirable.

DISCLOSURE OF THE INVENTION

In order to solve these prior art problems discussed above, the present invention is directed to a light-screening film paint for lamps comprising (1) at least one compound of either manganese oxide or an iron oxide compound doped with a metallic manganese and having the formula $(Fe_xMn_{1-x})_2O_3$ where 0.95>x>0.70, and (2) powder glass containing at least one of silica, zinc oxide, is boron oxide and aluminum oxide.

The present invention is also directed to a light-screening film for lamps made by firing a light-screening film paint at a high temperature, containing a compound of manganese oxide, iron oxide and zinc oxide, and, in addition, powder glass containing at least one of silica, zinc oxide, boron oxide and aluminum oxide.

The present invention is also directed to a method for producing a light-screening film for lamps, including the steps of: preparing a light-screening film paint for lamps containing (1) at least one compound of either manganese oxide or an iron oxide compound doped with a metallic manganese and having the formula $(Fe_xMn_{1-x})_2O_3$ where 0.95>x>0.70, and (2) powder glass containing at least one of silica, zinc oxide, boron oxide and aluminum oxide, applying the above paint to the surface of a lamp and forming a light-screening film by firing at a temperature not higher than 1200° C.

After a tentative drying step following application of a paint, a paint film is formed on the glass surface by the binder action of methyl cellulose, poly(vinyl alcohol) and acrylic resin. Methyl cellulose also functions to inhibit the sedimentation, coagulation or separation of pigment powder in a paint. The paint can be stabilized by adding 0.2 to 2 parts of methyl cellulose to 100 parts of powder. By setting the solid fraction in the paint to be not less than 40% by weight, dry contraction or liquid dripping after the paint has been applied can be suppressed, thereby permitting a high precision light-screening film pattern to be formed.

Preferably, by adding 0.2 to 2 parts of either silica having a primary grain size of not greater than 100 nm or mineral clay containing silica to 100 parts of powder, the paint can be made thixotropic, so that it is possible stably to apply the paint by using a coater.

During firing at a temperature not higher than 150° C., methyl cellulose, poly(vinyl alcohol) and acrylic resin are thermally decomposed; consequently, their residue in the paint film vanishes. During firing at a temperature not higher than 1500° C., powder glass contained in the paint melts and functions as a binder. By using glass that contains mainly zinc oxide and silica as powder glass, a light-screening film having a high adhesion strength to the surface of quartz glass is formed. By using powder glass having a melting point of not higher than 1000° C. and setting the firing temperature at not higher than 1000° C., one can prevent the deterioration of lamp performance.

By using powder glass having a thermal expansion coefficent not higher than $10^{-6}$, the difference in thermal expansion coefficient between the film and a quartz glass tube decreases and the peeling of a light-screening film due to localized ups and downs of temperature caused by the lighting and extinction of a lamp hardly occurs.

By using powder glass that will crystallize under a temperature not lower than 600° C., the deterioration of light-screening film strength due to a rise in temperature caused by lighting the lamp after firing can be prevented.

By allowing the firing to proceed under any of a nitrogen atmosphere, an inert atmosphere, or a vacuum atmosphere of not more than $10^{-2}$ Torr, the metal electrode material for a main lamp body is kept from being oxidized, so that a light-screening film can be formed without deterioration of the lamp performance.

BRIEF DESCRIPTION OF THE DRAWINGS

FIG. 3 is a table showing the mixing ratios in the mixture of manganese oxide powder and powder of the iron oxide compound doped with a metallic manganese and having the formula $(Fe_xMn_{1-x})_2O_3$ where 0.95>x>0.70 and the evaluation results of obtained light-screening films;

FIG. 4 is a table showing the manganese contents of powder of the iron oxide compound doped with a metallic manganese and having the formula $(Fe_xMn_{1-x})_2O_3$ where 0.95 >x>0.70 and the evaluation results of the corresponding light-screening films;

FIG. 5 is a table showing the softening points of powder glass and the evaluation results of obtained light-screening films;

FIG. 6 is a table showing the added amounts of mineral clay containing silica and the evaluation results of obtained paints; and FIG. 7 is a table showing the added amounts of methyl cellulose and the evaluation results of obtained light-screening paints.

DETAILED DESCRIPTION OF THE PREFERRED EMBODIMENTS

Figure 1:
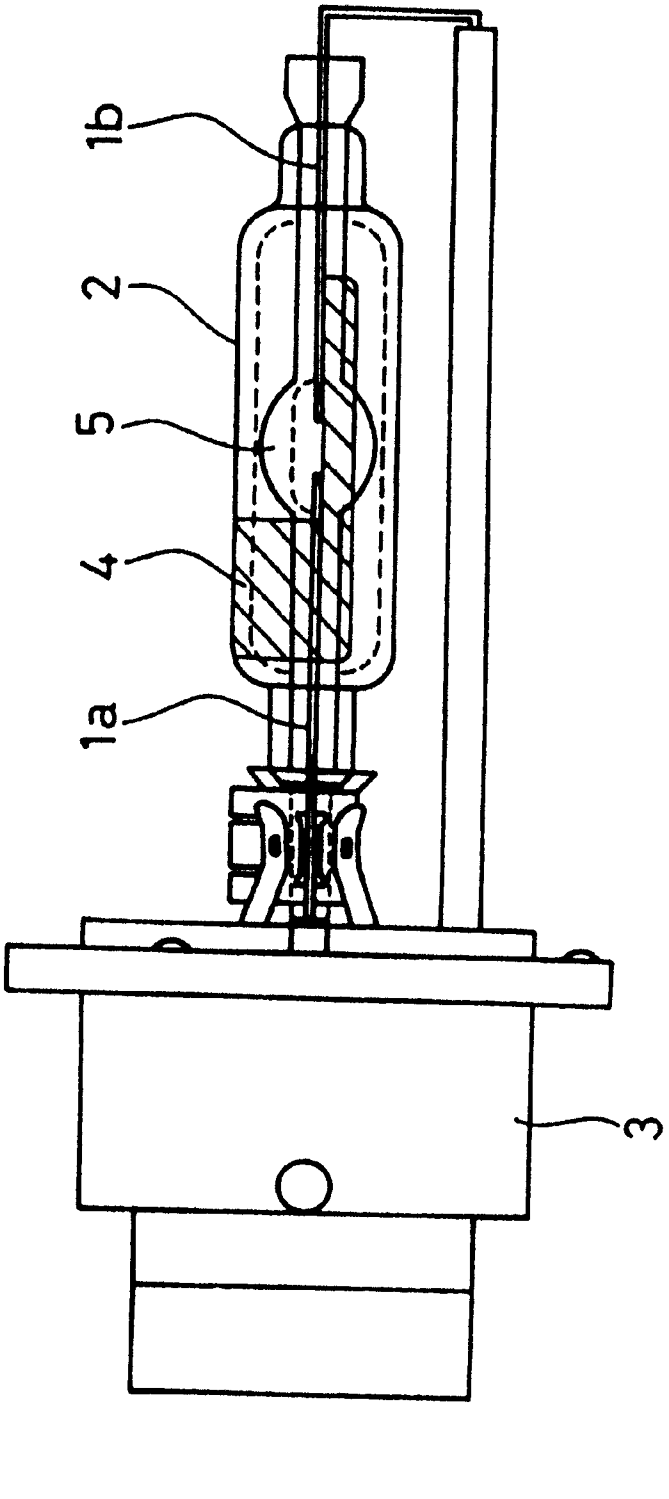
FIG. 1 is an outside view of a discharge lamp.

In one embodiment of the present invention, 100 g of manganese oxide having a grain size distribution of 1 μm to 20 μm, 100 g of powder of an iron oxide doped with about 20% by of manganese (thus having the formula $(Fe_{0.8}Mn_{0.2})_2O_3$) and having a grain size distribution of 0.3 μm to 3μm, and 100 g of powder glass containing about 70% by weight of zinc oxide, aluminum oxide and silica were dry-mixed in an agate mortar for one hour to form a mixture. The powder glass employed is one that melts at about 700° C. and crystallizes as the temperature is raised up to 750° C.

The iron oxide compound doped with a metallic manganese and having the formula $(Fe_xMn_{1-x})_2O_3$ where 0.95 >x>0.70 used in the present invention is not formed by conventional dry reaction among powder components. The compound is formed using a synthesis method wherein $Fe(OH)_3$ and $Mn(OH)_4$ are mixed in a water solution in black in an appropriate stoichiometric ratio and then dried to form particles. The stoichiometric ratio is chosen depending on the desired amounts of iron and manganese in the iron oxide compound. The particles are then fired at 800° C. under atmospheric pressure.

Then, 300 g of water containing 3% by weight of methyl cellulose and the foregoing mixture were mixed in a disper mill, and the powder obtained was dispersed into water using a high-speed disperser. The mixing was performed at a surface speed of the high-speed disperser of not lower than 5 m/s. The solid ratio of the paint was set to be 50% by weight. By adding one part of silica powder having a grain size not larger than 100 nm to 100 parts of the powder component and dispersing it, the coating will possess a good thixotropy.

The light-screening film paint prepared in the foregoing manner was applied by a coater to the quartz glass surface of a lamp and fired at 800° C. for an hour after transient drying at 100° C. Firing was conducted under a vacuum atmosphere of $1\times10^{-4}$ Torr.

The light-screening film so formed on the glass surface of a highly luminous discharge lamp has a high adhesion strength to the lamp; the color of the whole film was black.

The light-screening film obtained was evaluated by discoloration measurement after lighting, film strength measurement, transmissibility measurement, and surface observation after lighting.

Changes in the color of a light-screening film were measured with a chroma meter and evaluated in accordance with the Lab method. From changes in the respective values of L, and b, ΔEab was calculated. The passable levels for evaluation were set at a ΔEab value determined to be not greater than 1, calculated from measurements of the color of a light-screening film both before lighting and after lighting for 1,500 hours.

The film strength, determined by the cross cut test according to JIS (Japanese Industrial Standards) Z 1522, was examined respectively before lighting and after 1,500 hours of lighting. A light-screening film was cut into specimens with a diamond cutter and tapes were pasted to the respective specimens and peeled. The peeling degree of the light-screening film observed at that time was examined. Only those in which no peeling whatever was observed were determined to be at the passable level.

The passable level for transmittance measurements was taken at a leaking light ratio of not greater than 0.5%.

Figure 2:
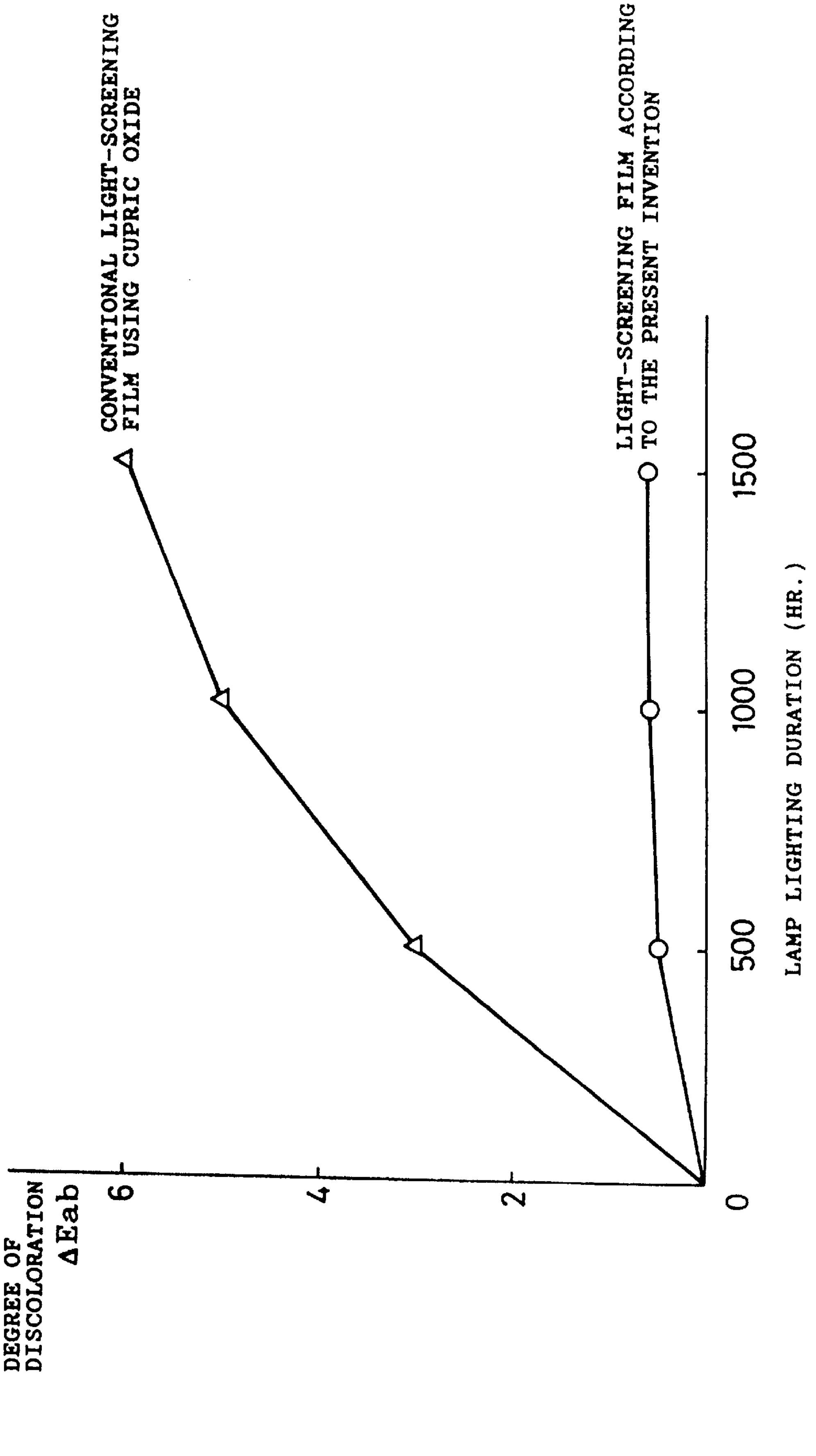
FIG. 2 is an illustration of the measured results of discoloration degree for a light-screening film of the present invention and a conventional light-screening film.

FIG. 2 shows the results of discoloration measurements of the light-screening film obtained in the foregoing embodiment. A light-screening film of the present invention has a much smaller degree of discoloration than that of a conventional light-screening film using cupric oxide as pigment; the film of the present invention had a ΔEab value of not greater than 1 after 1,500 hours of lighting.

In the above embodiment, 67 parts by weight of powder glass mainly containing zinc oxide was mixed with 100 parts in total of the mixture of manganese oxide powder and powder of an iron oxide compound doped with a metallic manganese containing about 20% by weight of manganese thus having the formula $(Fe_{0.8}Mn_{0.2})_2O_3$) to prepare a paint. Light-screening films comparable to the one obtained in the above embodiment also were prepared at other ratios.

FIG. 3 shows (1) the mixing ratios of the mixture of manganese oxide powder and a powder of an iron oxide compound doped with a metallic manganese containing about 20% by weight of manganese thus having the formula $(Fe_{0.8}Mn_{0.2})_2O_3$) to powder glass mainly containing zinc oxide and (2) the evaluation results of the obtained light-screening films. It was shown that a good light-screening film can be obtained by mixing 30 to 100 parts of powder glass mainly containing zinc oxide with 100 parts of the mixture of manganese oxide powder and a powder of an iron oxide compound doped with metallic manganese and having the formula $(Fe_xMn_{1-x})_2O_3$ where 0.95 >x>0.70.

In the above embodiment, the manganese content in iron oxide compound doped with metallic manganese was 20% thus having the formula $(Fe_{0.8}Mn_{0.2})_2O_3$), but results similar to the one obtained in the above embodiment were also obtained at other stoichiometric ratios of iron and manganese. FIG. 4 shows those results. From FIG. 4 the most appropriate content of manganese was found to range from 5 mol % to 30 mol %, which conforms to the structural formula depicted herein.

In the above embodiment, powder glass mainly containing zinc oxide was used, but powder glass mainly containing any of zinc oxide, boron oxide, aluminum oxide, or silica also resulted in a light-screening film equivalent to the one obtained in the above embodiment.

When using a powder glass containing a large amount of alkaline metal or alkaline earth metal, no good result was obtained because the powder glass reacted to cause the external quartz glass tube to be devitrifed.

In the above embodiment, powder glass that begins to melt at 700° C. and is crystallized at 750° C. was used, but light-screening films equivalent to the one obtained in the above embodiment were obtained for powder glass having other softening points. FIG. 5 shows those results. To allow glass to melt sufficiently, the firing temperature was set to the softening temperature plus 100° C. From FIG. 5 it can be seen that is appropriate that the melting point of the powder glass ranges from 600° C. to 1,100° C., both inclusive, and the firing temperature should be higher than 1,200° C.

And with respect to film adhesion strength using glass to be crystallized with elevating temperature provides a rather preferred result.

In the above embodiment, thixotropicity was given to the paint by adding one part of silica powder having a grain size of not greater than 100 nm to 100 parts of the powder. Equivalent results were also obtained by using swelling clay minerals such as smectite-containing silica rather than silica powder. The quantity of powder referred to here is the total quantity of a mixture of manganese oxide, the iron oxide compound doped with a metallic manganese and having the formula $(Fe_xMn_{1-x})_2O_3$ where 0.95>x>0.70, and powder glass.

Silica powder having a larger grain size than 100 nm provides no desired effect.

A most appropriate added amount of silica powder depends on the coater used or the thickness desired, but the results of the present invention in working examples are shown in FIG. 6. FIG. 6 shows that 0.2 part to 2 parts of silica added to 100 parts of powder quantity is suitable to attain a stable coating that is not subject to liquid dripping or the like. FIG. 6 shows the results from using swelling clay minerals containing silica. Equivalent results were also obtained using silica powder having a grain size of not greater than 100 nm.

In the above embodiment, methyl cellulose was used, but equivalent paints were also obtained when using poly(vinyl alcohol) or acrylic resin in place thereof.

FIG. 7 shows the results of correspondence between the added amount of methyl cellulose and the nature of the coated film. FIG. 7 shows that the added amount of methyl cellulose is preferably 0.2 to 2 parts to 100 parts of powder quantity. While FIG. 7 shows results when methyl cellulose is used, equivalent results were also obtained when using poly(vinyl alcohol) or acrylic resin in place thereof.

In the above embodiment, firing was conducted in an atmosphere of $1\times10^4$ Torr. As a result of examinations on the degree of vacuum, firing in a vacuum atmosphere of not lower than $1\times10^2$ Torr provided no favorable result because the tungsten electrode section of the lamp of FIG. 1 was oxidized. Thus, the degree of vacuum was found preferably to be not higher than $1\times10^2$ Torr.

According to the present invention, as described above, a favorable effect in a light-screening film formed on the glass surface of a highly luminous discharge lamp was obtained wherein the adhesion strength to a lamp is strong, the color of the whole film is black and neither peeling nor discoloration of the light-screening film occurs even after a lighting period of 2000 hours.

What is claimed is:

1. A light-screening film paint for lamps comprising:

an iron oxide compound doped with a metallic manganese and having the formula $(Fe_xMn_{1-x})_2O_3$ where 0.95>x>0.70; and powder glass containing at least one of silica, zinc oxide, boron oxide and aluminum oxide.

2. The light-screening film paint of claim 1, further comprising water as a solvent.

3. The light-screening film paint of claim 1, further comprising at least one of methyl cellulose, poly(vinyl alcohol), and acrylic resin.

4. The light-screening film paint of claim 3, wherein the amount of at least one of methyl cellulose, poly(vinyl alcohol) and acrylic resin ranges from 0.2 to 2 parts relative to 100 parts of powder quantity.

5. The light-screening film paint of claim 1, further comprising silica having a primary grain size of not greater than 100 nm.

6. The light-screening film paint of claim 1, further comprising clay mineral containing silica having a primary grain size of not greater than 100 nm.

7. The light-screening film paint of claim 1, having a solid fraction not smaller than 40% by weight.

8. The light-screening film paint of claim 1, wherein the melting point of powder glass is not higher than 1,200° C.

9. The light-screening film paint of claim 1, wherein the thermal expansion coefficient of the powder glass is not higher than $10^{-6}$.

10. The light-screening film paint of claim 1, wherein relative to 100 parts of an iron oxide compound doped with a metallic manganese and having the formula $(Fe_xMn_{1-x})_2O_3$ where 0.95>x>0.70, the mixing ratio of said powder glass containing at least one of silica, zinc oxide, boron oxide and aluminum oxide ranges from 30 parts by weight to 100 parts by weight.

11. The light-screening film paint of claim 1, further comprising manganese oxide.

* * * * *